United States Patent
Finch et al.

(10) Patent No.: US 9,574,079 B2
(45) Date of Patent: Feb. 21, 2017

(54) AQUEOUS BINDER COMPOSITIONS OF ALIPHATIC OR CYCLOALIPHATIC DICARBOXALDEHYDES AND RESORCINOL

(71) Applicants: Rohm and Haas Company, Philadelphia, PA (US); Dow Global Technologies LLC, Midland, MI (US)

(72) Inventors: William C. Finch, Ambler, PA (US); Sudhir M. Mulik, North Wales, PA (US); Manesh Nadupparambil Sekharan, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 1 day.

(21) Appl. No.: 14/552,889

(22) Filed: Nov. 25, 2014

(65) Prior Publication Data

US 2015/0148484 A1    May 28, 2015

Related U.S. Application Data

(60) Provisional application No. 61/908,884, filed on Nov. 26, 2013.

(51) Int. Cl.
| | |
|---|---|
| C08L 61/12 | (2006.01) |
| C08G 8/04 | (2006.01) |
| C08G 14/08 | (2006.01) |
| C09J 161/12 | (2006.01) |
| C09J 161/34 | (2006.01) |
| C08L 61/34 | (2006.01) |

(52) U.S. Cl.
CPC ............... *C08L 61/12* (2013.01); *C08G 8/04* (2013.01); *C08G 14/08* (2013.01); *C08L 61/34* (2013.01); *C09J 161/12* (2013.01); *C09J 161/34* (2013.01); *C08L 2201/54* (2013.01)

(58) Field of Classification Search
CPC ....... C08K 5/5435; C08L 63/00; C08L 61/12; C08L 61/34; C08L 2201/54; C09J 161/12; C09J 161/34; C08G 14/08; C08G 8/04

See application file for complete search history.

(56) References Cited

U.S. PATENT DOCUMENTS

| | | | | |
|---|---|---|---|---|
| 3,444,119 A * | 5/1969 | Le Blanc | .................. | C08G 8/10 524/595 |
| 4,742,111 A * | 5/1988 | Chi | .......................... | C08K 3/36 524/596 |
| 5,198,266 A * | 3/1993 | Witucki | .................... | C09D 5/24 427/126.2 |
| 5,714,544 A * | 2/1998 | Ohya | ........................ | C08G 8/38 525/154 |
| 6,646,094 B1 * | 11/2003 | Malhotra | ................. | C03C 25/34 524/841 |
| 6,772,820 B2 * | 8/2004 | Roze | ..................... | B22C 1/2273 164/16 |
| 2004/0116647 A1 | 6/2004 | Swedo | | |
| 2007/0123736 A1 * | 5/2007 | Nishikubo | .............. | C07C 13/70 568/632 |
| 2007/0155944 A1 * | 7/2007 | Shooshtari | ............... | C08G 6/02 528/129 |
| 2011/0098380 A1 * | 4/2011 | Hearn | ...................... | C07C 37/20 523/400 |
| 2011/0303880 A1 * | 12/2011 | Mulik | ..................... | C01B 31/00 252/502 |
| 2012/0302727 A1 * | 11/2012 | Mullins | .................. | C08G 59/08 528/398 |
| 2013/0066026 A1 * | 3/2013 | Wilson | .................. | C07C 211/50 525/523 |
| 2014/0348937 A1 * | 11/2014 | Tomlinson | ............. | A01N 25/28 424/501 |
| 2015/0148484 A1 * | 5/2015 | Finch | ....................... | C08G 8/04 524/841 |

FOREIGN PATENT DOCUMENTS

| | | |
|---|---|---|
| AU | 199352139 | 6/1994 |
| CN | 102504292 A | 6/2012 |
| JP | 2011195647 A | 10/2011 |

OTHER PUBLICATIONS

Ramires et al., "Biobased composites from glyoxal-phenolic resins and sisal fibers," Bioresource Technology, No. 101, 2010, pp. 1998-2006.

Tunca et al., "Condensation Polymers From Diphenols and Glyoxal," Eur. Polym. J., vol. 31, No. 1, 1995, pp. 9-14.

* cited by examiner

*Primary Examiner* — Michael A Salvitti
(74) *Attorney, Agent, or Firm* — Andrew Merriam

(57) ABSTRACT

The present invention provides substantially formaldehyde free aqueous thermosetting binder resins from resorcinol and cycloaliphatic dialdehydes, glutaraldehyde or their mixtures and urea which may be excluded or included up to amounts which deter hot wet tensile strength in the cured binder. The compositions provide binders that on a performance cost basis are equivalent to phenol formaldehyde resins but without the formaldehyde.

9 Claims, No Drawings

AQUEOUS BINDER COMPOSITIONS OF ALIPHATIC OR CYCLOALIPHATIC DICARBOXALDEHYDES AND RESORCINOL

The present invention relates to thermosetting aqueous binder compositions comprising resorcinol dialdehyde resins, as well as to methods of making and using the aqueous binder compositions and to thermoset products thereof, such as mineral wool fiber insulation and mats, wood composites and resin coated proppants.

Phenolic resins are widely used as binders for nonwoven fiberglass and/or stonewool mats and wood composites (OSB and plywood structural panels). Presently, there are no formaldehyde free thermosetting binder resins that can compete with urea-formaldehyde (UF) or phenol-formaldehyde (PF) on a cost for performance basis. However, the increasing classification of formaldehyde as a carcinogen worldwide and increasing evidence supporting this classification has left binder applicators looking for a replacement for such UF and PF thermosetting binder resins for their known uses.

A binder useful in several applications is desired. For example, stonewool fibers find extensive use in commercial insulation products. Being very basic, stonewool fiber demands a binder which can cure as well as perform under basic pH conditions. In another example, a hydraulic fracturing process use curable resin-coated sand to minimize or prevent flowback from a fracture during cleanup or production in oil and gas wells.

Recently, U.S. patent publication 2007/0155944A, to Shoostari et al. discloses fiberglass binders of cured benzohydro-benzofurane binders which can comprise curable resins made from the reaction of phenolics and multialdehydes, including dialdehydes, and multiketones. However, such materials comprise the reaction product of an excess of the dialdehyde which would not be expected to work as a binder for stonewool.

The present inventors have endeavored to solve the problem of providing a versatile substantially formaldehyde free binder comprising a material which can be used in an alkaline environment and provides robust mechanical properties when cured.

STATEMENT OF THE INVENTION

1. In accordance with the present invention, substantially formaldehyde free thermosetting binder compositions comprise resorcinol dialdehyde resins from (i) resorcinol and (ii) one or more dialdehyde chosen from cyclohexane dicarboxaldehyde, s glutaraldehyde, or their mixtures.

2. The compositions of the present invention in 1, above, wherein the dialdehyde is a cyclohexane dicarboxaldehyde chosen from cis-1,3 cyclohexane dicarboxaldehyde, a trans-1,3 cyclohexane dicarboxaldehyde, a cis-1,4 cyclohexane dicarboxaldehyde, a trans-1,4 cyclohexane dicarboxaldehyde, or a mixture of any two or more thereof.

3. The compositions of the present invention as in any of 1 or 2, above, wherein the ratio of the number of hydroxyl equivalent groups of the resorcinol to the number of aldehyde equivalent groups of the one or more dialdehyde ranges from 1:1 to 4:1, or, more preferably, 1:1 to 3:1.

4. The compositions of the present invention as in any of 1, 2, or 3, above, comprising resorcinol dialdehyde resin from the (i) resorcinol, the (ii) one or more dialdehyde and (iii) urea.

5. The compositions of the present invention as in any of 1, 2, 3 or 4 above, further comprising an epoxy functional hydrolysable silane, such as an alkoxy silane, preferably, 3-glycidoxypropyl trimethoxy silane.

6. The compositions of the present invention as in any of 1, 2, 3, 4, or 5, above, wherein the binder compositions are aqueous binder compositions or binder composition powders.

7. In another aspect of the present invention, methods of making a substantially formaldehyde free thermosetting binder compositions comprise reacting an aqueous mixture of (i) resorcinol and (ii) one or more dialdehyde chosen from cyclohexane dicarboxaldehyde, glutaraldehyde, or their mixtures in the presence of a hard base catalyst to form a resorcinol dialdehyde resin, wherein the ratio of the number of hydroxyl equivalent groups of the resorcinol to the number of aldehyde equivalent groups of the one or more dialdehyde ranges from 1:1 to 4:1, more preferably, 1:1 to 3:1.

8. The methods of the present invention in 7, above, wherein the mixture further comprises (iii) urea.

9. The methods of the present invention as in 8, above, wherein in the reacting an aqueous mixture the mole ratio of (iii) urea to the total moles of the (ii) one or more s dialdehyde ranges from 0:1 to 10:1 where the dialdehyde comprises glutaraldehyde and ranges from 0:1 to 4:1 where the one or more dialdehyde comprises cyclohexane dialdehyde.

10. In yet another aspect of the present invention, methods of using the thermosetting binder compositions comprise treating a substrate with the substantially io formaldehyde free thermosetting binder compositions as in any of 1, 2, 3, 4, or 5, above, followed by heating the thus treated substrates or mixtures to cure the binder, for example, at from 100 to 400° C.

Suitable substrates may include fibers, slivers, chips, particles, films, sheets, and combinations thereof. Suitable substrate materials may include, for example, glass, glass fiber, stonewool fibers, composites and composite fibers or of organic and inorganic substrates, sand, stone, wood, or woody materials.

As used herein, the phrase "aqueous" or includes water and mixtures composed substantially of water and water-miscible solvents.

As used herein, the phrase "based on the total solids" refers to weight amounts of any given ingredient in comparison to the total weight amount of all of the non-volatile ingredients in the binder (e.g. resorcinol dialdehyde resins, silanes & etc).

As used herein, the phrase "emulsion polymer" refers to a polymer that when combined with water or aqueous solvent forms a disperse phase of an aqueous emulsion.

As used herein, the phrase "number of equivalent groups" means the number of moles of such a group, e.g. hydroxyl, in a given composition. Thus, one mole of resorcinol has a number of 2 hydroxyl equivalent groups.

As used herein, the term "hard base catalyst" means any inorganic bases such as alkali and alkaline earth hydroxides, preferably NaOH or KOH.

As used herein, the phrase "substantially formaldehyde-free" refers to compositions free from added formaldehyde, such as phenol formaldehyde resins, and which do not liberate substantial formaldehyde as a result of drying and/or curing. Preferably, such binder or material that incorporates the binder liberates less than 100 ppm of formaldehyde, more preferably less than 50 and most preferably less than 25 ppm of formaldehyde, as a result of drying and/or curing the binder.

As used herein, "wt. %" or "wt. percent" means weight percent based on solids.

As used herein, the phrase "based on the total binder solids" refers to weight amounts of any given ingredient in comparison to the total weight amount of all of the non-volatile ingredients in the binder (e.g., resins, silanes, fire retardants, emulsion copolymer(s), reactive water proofing agents, and the like).

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of from 1:1 to 4:1, or, preferably, from 1.2:1 to 3:1, or, more preferably, 1.5:1 to 3:1 means any and all of from 1:1 to 4:1, from 1:1 to 1.2:1, from 1:1 to 3:1, preferably, from 1.2:1 to 3:1, from 1.2:1 to 4:1, more preferably, from 1.5:1 to 3:1, from 1.5:1 to 4:1, from 1:1 to 1.5:1, from 1:1 to 1.2:1, from 1.2:1 to 1.5:1, and from 3:1 to 4:1.

Unless otherwise indicated, conditions of temperature and pressure are room temperature and standard pressure, also referred to as "ambient conditions". The aqueous binder compositions may be dried under conditions other than ambient conditions.

According to the present invention, thermoset binder resins made out of resorcinol-dialdehyde provide a substantially formaldehyde free alternative to the formaldehyde based binders used in composite industry. The resorcinol dialdehyde resins are versatile and inexpensive and can provide binders for fiber composites, non-wovens and coatings for proppants. As the resins are substantially formaldehyde free, as defined above, they would contain little or no added phenol formaldehyde resins. With urea extension this chemistry becomes even more cost competitive with phenol formaldehyde resins, such as those used in nonwoven fiberglass industry. In fact, the cured thermoset resins containing just 1 wt. % of silane, based on total resin solids, exhibit as high as a 90% retention of dry tensile properties after being subjected to hot-wet conditions.

Urea may be included in the substantially formaldehyde free thermosetting binder compositions in amounts that do not impair hot-wet retention of tensile strength. Surprisingly, the inventors have found that more urea can be used to extend resorcinol dialdehyde resins when glutaraldehyde is used as the dialdehyde, without impairing hot-wt. tensile strength.

In the substantially formaldehyde free resorcinol dialdehyde resin binder compositions of the present invention comprising glutaraldehyde, the compositions may comprise from 0 to 12 moles of urea per mole of glutaraldehyde, or, preferably, from 0 to 10 moles of urea per mole of glutaraldehyde, or, more preferably, from 0 to 6 moles per mole of glutaraldehyde. where the compositions comprise 10 or more moles of urea per mole of glutaraldehyde, the compositions further comprise from 0.1 to 1.5 wt. % of the silane of the present invention.

In the substantially formaldehyde free resorcinol dialdehyde resin binder compositions of the present invention, from 0 to 7.5 moles of urea can be used per mole of cyclohexane dicarboxaldehyde, or, preferably, from 0 to 5 moles of urea can be used per mole of cyclohexane dicarboxaldehyde.

The one or more dialdehyde used in making the resorcinol dialdehyde resin of the present invention may comprise the addition product of 1,3-butadiene and acrolein to make a 3-cyclohexene 1-carboxaldehyde. The product can by hydroformylated in the presence of carbon monoxide, hydrogen, and metal-organophosphorous ligand complex catalyst to make mixtures of 1,3- and 1,4-cyclohexane dicarboxaldehydes as is disclosed, for example, in U.S. Pat. No. 6,252,121.

In the methods for making the substantially formaldehyde free resorcinol dialdehyde resins of the present invention, the equivalent ratio of hydroxy groups in the base catalyst to the hydroxy groups which are present in the aqueous mixture of resorcinol and dialdehyde may be 0:1 to 0.28:1, preferably be not higher than 0.28:1. The amount of catalyst used is inversely proportional to the gelation time of the binder compositions, after which they will not be useable. Gelation time may be delayed for storage or shipment. At least a gelation time of 3 days is acceptable, and it is preferred that there is no gelation.

In the methods for making the substantially formaldehyde free resorcinol dialdehyde resins of the present invention, the temperature in reacting an aqueous mixture may range from 0° C. to 99° C., preferably, 20° C. to 80° C.

In the methods for making the substantially formaldehyde free resorcinol dialdehyde resins of the present invention, the resorcinol dialdehyde resin product may be dried to form a non-tacky powder or finely divided material.

In accordance with the binder compositions of the present invention one or more hydrolysable epoxy silane compound is included to insure retention of mechanical properties when wet. Such compounds may include, for example, 3-glycidoxypropyl trimethoxysilane.

The amount of the hydrolysable epoxy silane may range from 0.1 to 2.5 wt. %, based on total resin composition solids, or, preferably, from 0.3 to 1.5 wt. %, or, more preferably, 0.9 wt. % or more.

Preferably for flexible binders, the thermosetting binder compositions further comprise an emulsion polymer. Suitable emulsion polymers may comprise acrylic emulsions having, as polymerized units up to 30 wt. % polymerized acid comonomers, preferably from 1 to 20 wt. %, or, preferably, from 10 to 18 wt. %, based on the total weight of copolymerized monomers, hydrophobic emulsion polymers comprising greater than 30% by weight, based on the weight of the emulsion polymer solids, ethylenically-unsaturated acrylic monomer containing a $C_2$ or greater alkyl group, and acrylic or styrene acrylic emulsion polymers. Suitable acid comonomers used to make the emulsion polymers may include, for example, methacrylic acid, acrylic acid, fumaric acid, maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. (Meth)acrylic acid is the preferred carboxy acid co-monomer.

The emulsion polymers may be present in the composition in an amount of 1% or more, or, 5% or more, or, up to 30%, or up to 10% by weight, based on the total binder composition solids.

The substantially formaldehyde free binder compositions of the present invention may further comprise other additives known in the art including, but not limited to, polymeric polyacid aqueous solution polymers such as polyacrylic acid; surfactants to help flow (silicones, fatty acids); biocides; corrosion inhibitors or passivators for metal surfaces, such as, for example, triazole and phosphate compounds, tin oxalates, thioureas, oxalates, chromates, and pH adjustors; lubricants; de-dusting oils, such as, for example, mineral oils; anti-foaming agents such as dimethicones, silicon-polymer (polysiloxane) oils and ethoxylated nonionics; and flame retardants like a bromide flame retardant (decabromodiphenyl oxide/antimony trioxide). Preferably, any such additive is formaldehyde free or do not contain or generate formaldehyde during binder formation, application or cure.

The substantially formaldehyde free thermosetting binder compositions of the present invention may comprise a total solids of from 25 to 100 wt. %, preferably, 40 to 95wt. % or more, or, preferably, 90 wt. % or less, based on the total weight of the binder compositions. Powders comprise 100% solids, even if they are at least partly hydrous.

In the methods for using the substantially formaldehyde free resorcinol dialdehyde resins of the present invention, a melt of the resorcinol dialdehyde resin may be used at 100 wt. % solids.

The present invention provides methods of using the substantially formaldehyde free binder comprising applying the binder compositions to a substrate and curing. With aqueous binder compositions, curing includes drying. In curing the curable compositions, the duration, and temperature of heating, will affect the rate of drying, ease of processing or handling, and property development of the treated substrate. Suitable heat treatment temperatures may range from 150° C. or more, and up to 400° C. The preferred treatment is substrate dependant. Thermally sensitive substrates such as cellulose fibers may be treated at 130 to 175° C. while thermally less sensitive composites may be treated at 150 to 200° C. and thermally resistant substrates such as mineral fibers may be treated at 220 to 300° C. for the desired times necessary to effect cure. Sand or other proppants may be treated at 120 to 220° C.

Melts of the resorcinol dialdehyde resins of the present invention, which contain no water, may be used at temperatures of 25° C. or higher and up to 400° C.

In the methods of using the substantially formaldehyde free binder compositions of the present invention to coat proppants, the methods comprise preheating the proppant substrate, making a preheated proppant substrate, and adding the binder composition to the proppant substrate while stirring for a period of from 60 seconds to 10 minutes, or, preferably, 5 minutes or less. Silane may be added during processing or may be present in the resin prior to adding the resin.

Preferably, the methods of using the substantially formaldehyde free binder compositions to coat preheated proppant substrates comprise two or more stages of adding binder compositions to the proppant substrate while stirring, wherein in the first such stage silane is included into the binder composition and the first stage is followed by a second or subsequent stage wherein the binder compositions do not include a silane. The first stage may take from 15 seconds to 2 minutes.

The binder compositions of the present invention can be applied to a substrate, such as, for example, a web of fibers, by any suitable means including, for example, air or airless spraying, electrostatic spray, fluidized bed apparatus, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

In applying binder, the binder add on level in substrate can range from 3 wt. % or more, or 10 wt. % or more, or up to 60 wt. percent of the finished substrate, preferably 12 wt. % or more, or, most preferably 15 to 25 wt. %, based on the total weight of the treated dry substrate, prior to cure.

Suitable substrates for binder application may include, for example, mineral fibers, such as glass and mineral fibers, slag or stonewool, ceramic fibers, metal fibers, carbon fibers, and woven and non-woven fabrics made therefrom; finely divided inorganic materials, such as sand and ground stone, and heat-sensitive substrates, such as wood, including, solid wood, wood particles, fibers, chips, pulp and flakes, paper and cardboard.

The binders of this invention may preferably be used to treat non-woven webs. "Non-woven web(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof.

Some suitable uses for the binder of the present invention include, for example, making non-structural composites and laminates for indoor furniture, trim and molding; and the wet end formation and dry end treating or coating of paper, paperboard and cardboard, such as filter media; and the making and treating of woven and non-woven fabrics, such as, for example, fiberglass and stonewool insulation batting, polyester and spunbonded roof shingles, underlayment and scrim, and filter media, such as air and oil filters.

In another aspect, the present invention comprises a treated substrate, for example, a fiber matt, containing a cured binder resulting from applying the substantially formaldehyde free binder compositions of the present invention thereto. Preferably, the density of the fiber matt is from 5 to 220 (kg/m$^3$).

EXAMPLES

The following examples serve to better illustrate the invention, which is not intended to be limited by the examples.

Binder Preparation: In a 250 ml beaker equipped with a magnetic stirrer the desired amount of resorcinol (Sigma Aldrich, St. Louis, Mo.) was dissolved in deionized water. If the composition had urea in it, then the desired amount of urea was added under stirring at this point of time. The endothermic nature of reaction tends to cool down the solution so enough time (~10-15 min) was allowed for the solution to warm up to room temperature. About 10 wt. % (Equiv ratio of base to resorcinol OH=0.07:1) based on the amount by weight of resorcinol indicated in Table 1, below, of 50% aqueous sodium hydroxide solution (Sigma Aldrich) was added with the desired amount of 3-(glycidyloxypropyl) trimethoxysilane (Sigma Aldrich) under stirring. After 5-10 min of mixing, the amount of dialdehyde indicated in Table 1, below, was added with stirring.

Treatment of Glass Microfiber Filter Paper and Tensile Testing: Binders as shown in Table 1, below, were prepared by mixing the components as described in binder compositions preparation procedure, above, to provide aqueous solutions at 30 wt. % solids.

TABLE 1

Binder Compositions

| Example | Composition | Eq ratio of OH's of Resorcinol to aldehyde group of dialdehyde | Amt. of Resorcinol (g) | Amt. of Dialdehyde (g) | Amt of Urea (g) | Amt of Silane (g) | Amt of NaOH (g) (50 wt % aq.) | Amt of Water (g) |
|---|---|---|---|---|---|---|---|---|
| 1 | Resorcinol:CHDA | 2:1 | 40 | 25.45 | 0 | 0 | 4 | 156 |
| 2 | Resorcinol:CHDA | 2:1 | 40 | 25.45 | 0 | 0.34 | 4 | 156 |
| 3 | Resorcinol:CHDA | 2:1 | 40 | 25.45 | 0 | 0.68 | 4 | 156 |
| 4 | Resorcinol:CHDA | 2:1 | 40 | 25.45 | 0 | 1.01 | 4 | 156 |
| 5 | Resorcinol:CHDA | 2:1 | 40 | 25.45 | 0 | 1.35 | 4 | 156 |
| 6 | Resorcinol:Glut[1] | 2:1 | 40 | 36.36 | 0 | 0 | 4 | 120 |
| 7 | Resorcinol:Glut[1] | 2:1 | 40 | 36.36 | 0 | 0.30 | 4 | 120 |
| 8 | Resorcinol:Glut[1] | 2:1 | 40 | 36.36 | 0 | 0.60 | 4 | 120 |
| 9 | Resorcinol:Glut[1] | 2:1 | 40 | 36.36 | 0 | 0.90 | 4 | 120 |
| 10 | Resorcinol:Glut[1] | 2:1 | 40 | 36.36 | 0 | 1.20 | 4 | 120 |
| 11* | Resorcinol:Phthal | 2:1 | 30 | 18.29 | 0 | 0 | 3 | 115 |
| 12* | Resorcinol:Phthal | 2:1 | 30 | 18.29 | 0 | 0.25 | 3 | 115 |
| 13* | Resorcinol:Phthal | 2:1 | 30 | 18.29 | 0 | 0.5 | 3 | 115 |
| 14* | Resorcinol:Phthal | 2:1 | 30 | 18.29 | 0 | 0.75 | 3 | 115 |
| 15* | Resorcinol:Phthal | 2:1 | 30 | 18.29 | 0 | 1.00 | 3 | 115 |
| 16 | Resorcinol:CHDA | 2:1 | 20 | 12.72 | 21.84 | 0.56 | 2 | 130 |
| 17* | Resorcinol:CHDA | 2:1 | 20 | 12.72 | 43.68 | 0.78 | 2 | 182 |
| 18* | Resorcinol:CHDA | 2:1 | 10 | 6.36 | 32.76 | 0.49 | 1 | 117 |
| 19 | Resorcinol:Glut[1] | 2:1 | 22 | 20 | 24.02 | 0.57 | 2.2 | 123 |
| 20 | Resorcinol:Glut[1] | 2:1 | 16.5 | 15 | 36.03 | 0.60 | 1.65 | 135 |
| 21 | Resorcinol:Glut[1] | 2:1 | 13 | 11.81 | 42.58 | 0.62 | 1.3 | 140 |
| 22* | Resorcinol:Phthal | 2:1 | 20 | 12.19 | 21.84 | 0.55 | 2 | 129 |
| 23* | Resorcinol:Phthal | 2:1 | 15 | 9.14 | 32.76 | 0.58 | 1.5 | 135 |
| 24* | Resorcinol:Phthal | 2:1 | 10 | 6.09 | 32.76 | 0.49 | 1 | 116 |
| 25 | Resorcinol:CHDA | 1:1 | 25 | 31.81 | 0 | 0.58 | 2.5 | 136 |
| 26 | Resorcinol:CHDA | 1:1 | 15 | 19.09 | 32.76 | 0.67 | 1.5 | 158 |
| 27 | Resorcinol:CHDA | 1:1 | 10 | 12.72 | 43.68 | 0.67 | 1 | 156 |
| 28* | Resorcinol:CHDA | 1:1 | 5 | 6.36 | 32.76 | 0.44 | 0.5 | 104 |
| 29 | Resorcinol:Glut[1] | 1:1 | 30 | 54.54 | 0 | 0.59 | 3 | 120 |
| 30 | Resorcinol:Glut[1] | 1:1 | 15 | 27.27 | 32.76 | 0.62 | 1.5 | 120 |
| 31 | Resorcinol:Glut[1] | 1:1 | 10 | 18.18 | 43.68 | 0.63 | 1 | 120 |
| 32 | Resorcinol:Glut[1] | 1:1 | 7.5 | 13.63 | 49.14 | 0.64 | 0.75 | 120 |
| 33* | Resorcinol:Phthal | 1:1 | 25 | 30.48 | 0 | 0.58 | 2.5 | 115 |
| 34* | Resorcinol:Phthal | 1:1 | 15 | 18.29 | 32.76 | 0.67 | 1.5 | 115 |
| 35* | Resorcinol:Phthal | 1:1 | 10 | 12.19 | 43.68 | 0.67 | 1.0 | 115 |
| 36* | Resorcinol:Phthal | 1:1 | 5 | 6.09 | 32.76 | 0.44 | 0.5 | 115 |
| 37 | Resorcinol:CHDA | 2:1 | 40 | 25.45 | 0 | 0.68 | 0 | 156 |
| 38 | Resorcinol:CHDA | 2:1 | 40 | 25.45 | 0 | 0.68 | 0.8 | 156 |
| 39 | Resorcinol:CHDA | 2:1 | 40 | 25.45 | 0 | 0.68 | 1.2 | 156 |
| 40 | Resorcinol:CHDA | 2:1 | 40 | 25.45 | 0 | 0.68 | 2 | 156 |
| 41 | Resorcinol:CHDA | 2:1 | 40 | 25.45 | 0 | 0.68 | 8 | 156 |
| 42 | Resorcinol:CHDA | 2:1 | 40 | 25.45 | 0 | 0.68 | 16 | 156 |

*denotes Comparative Example;
[1]50 wt. % solution in water

Test Methods: The following test methods were used to evaluate the binder compositions of the present invention.

Tensile Testing: A binder impregnated microfiber filter (Whatman International Inc., Maidstone, England, GF/A, catalog No. 1820 866), in 20.3 cm×25.4 cm sheets was prepared by drawing a filter sheet through a trough filled with 120 grams of a 30 wt.

binder composition solution in water. Sandwiching the soaked sheets between two cardboard sheets to absorb excess binder, and pressing between the two cardboard sheets in a Birch Bros. Padder, 68.9476 kPa/speed 5 m/min. The resulting samples are dried @90° C. for 90 seconds in a Mathis Oven that is vented or equipped with a devolatilizer. The dried sheets were then cured at 210° C. for 180 seconds in the same type of Mathis oven used to dry the samples. Post curing weight was determined to calculate binder add-on (cured binder weight as a percentage of filter paper weight). "Add on" is the wt. % based on filter sheet weight of binder solids retained on the filter sheet after curing.

The cured sheets were cut into 2.54 cm (1 inch) (cross machine direction) by 10.16 cm (4 inch) (machine direction) strips and tested for tensile strength in the machine direction in a Thwing-Albert Intelect 500 tensile tester. The fixture gap was 5.08 cm (2 inches) and the pull rate was 2.54 cm (1 inch)/minute. Strips were tested either "as is" (Dry Tensile) or immediately after a 10 minutes soak in water at 80° C. (10 min Hot Wet Tensile). Tensile strengths were recorded as the peak force measured during parting and reported in newtons. Data reported are averages of 10 test strips and are presented in Tables 2, 3, and 4, below.

Acceptable dry tensile strength is >25N. The preferred dry tensile strength is >45 N. Acceptable wet tensile strength is >3N, or, preferably, >6N. Acceptable tensile strength retention (wet/dry) is >10% or an absolute measure of 3N or more. The preferred tensile strength retention (wet/dry) is >30%.

Post curing weight was determined to calculate binder add-on (cured binder weight as a percentage of filter paper weight). "Add on" is the wt. % based on filter sheet weight of binder solids retained on the filter sheet after curing.

The abbreviations used in the Tables below include: Glut: Glutaraldehyde, Phthal: Phthalic dialdehyde; CHDA: Cyclohexane dicarboxaldehyde.

TABLE 2

Tensile Strength Data

| Example | Composition | Eq ratio of OH group Resorcinol to Aldehyde group of dialdehyde | Mols of Urea per mol of dialdehyde | Silane (wt. %) | Dry Tensile Strength (N) | Hot-wet Tensile Strength (N) | Tensile Strength Retention (%) | Wt. % add on |
|---|---|---|---|---|---|---|---|---|
| 1 | Resorcinol:CHDA | 2:1 | 0 | 0 | 55.856 | 5.760 | 10.31 | 58.01 |
| 2 | Resorcinol:CHDA | 2:1 | 0 | 0.5 | 59.864 | 40.946 | 68.40 | 55.47 |
| 3 | Resorcinol:CHDA | 2:1 | 0 | 1 | 63.125 | 53.125 | 84.16 | 57.80 |
| 4 | Resorcinol:CHDA | 2:1 | 0 | 1.5 | 60.571 | 59.032 | 97.46 | 58.16 |
| 5 | Resorcinol:CHDA | 2:1 | 0 | 2.0 | 59.846 | 59.606 | 99.59 | 58.89 |
| 6 | Resorcinol:Glut | 2:1 | 0 | 0 | 72.795 | 10.498 | 14.42 | 61.20 |
| 7 | Resorcinol:Glut | 2:1 | 0 | 0.5 | 78.129 | 63.507 | 81.29 | 60.77 |
| 8 | Resorcinol:Glut | 2:1 | 0 | 1 | 70.829 | 63.863 | 90.17 | 61.74 |
| 9 | Resorcinol:Glut | 2:1 | 0 | 1.5 | 73.627 | 67.404 | 91.55 | 62.86 |
| 10 | Resorcinol:Glut | 2:1 | 0 | 2.0 | 72.021 | 68.952 | 95.74 | 62.20 |
| 11* | Resorcinol:Phthal | 2:1 | 0 | 0 | 23.687 | 0.000 | 0.00 | 13.22 |
| 12* | Resorcinol:Phthal | 2:1 | 0 | 0.5 | 23.144 | 0.000 | 0.00 | 13.23 |
| 13* | Resorcinol:Phthal | 2:1 | 0 | 1 | 21.200 | 0.000 | 0.00 | 13.39 |
| 14* | Resorcinol:Phthal | 2:1 | 0 | 1.5 | 24.020 | 0.000 | 0.00 | 13.90 |
| 15 | Resorcinol:Phthal | 2:1 | 0 | 2.0 | 21.618 | 0.000 | 0.00 | 13.58 |

*denotes Comparative Example

TABLE 3

Tensile Strength Data-Effect Of Urea In 2:1 Resorcinol:Dialdehyde Mol Ratio

| Example | Composition | Eq ratio of OH's of Resorcinol to aldehyde group of dialdehyde | Mols of Urea per mol Dialdehyde | Silane (wt. %) | Dry Tensile Strength (N) | Hot wet Tensile Strength (N) | Tensile Strength Retention (%) | Wt. % Add On |
|---|---|---|---|---|---|---|---|---|
| 3 | Resorcinol:CHDA | 2:1 | 0 | 1 | 63.125 | 53.125 | 84.16 | 57.80 |
| 16 | Resorcinol:CHDA | 2:1 | 4 | 1 | 40.523 | 20.057 | 49.50 | 21.74 |
| 17* | Resorcinol:CHDA | 2:1 | 8 | 1 | 23.945 | 2.967 | 12.39 | 12.07 |
| 18* | Resorcinol:CHDA | 2:1 | 12 | 1 | 21.383 | 2.349 | 10.98 | 7.62 |
| 8 | Resorcinol:Glut | 2:1 | 0 | 1 | 70.829 | 63.863 | 90.17 | 61.74 |
| 19 | Resorcinol:Glut | 2:1 | 4 | 1 | 49.349 | 47.338 | 95.93 | 24.82 |
| 20 | Resorcinol:Glut | 2:1 | 8 | 1 | 45.074 | 29.825 | 66.17 | 12.44 |
| 21 | Resorcinol:Glut | 2:1 | 12 | 1 | 37.881 | 26.614 | 70.26 | 9.35 |
| 13* | Resorcinol:Phthal | 2:1 | 0 | 1 | 21.200 | 0.000 | 0.00 | 13.39 |
| 22* | Resorcinol:Phthal | 2:1 | 4 | 1 | 10.049 | 0.000 | 0.00 | 3.84 |
| 23* | Resorcinol:Phthal | 2:1 | 8 | 1 | 8.114 | 0.000 | 0.00 | 3.32 |
| 24* | Resorcinol:Phthal | 2:1 | 12 | 1 | 9.368 | 0.000 | 0.00 | 3.09 |

*denotes Comparative Example

TABLE 4

Tensile Strength Data--Effect Of Urea In 1:1 Resorcinol:Dialdehyde Mol Ratio

| Example | Composition | Eq ratio of OH's of Resorcinol to aldehyde group of dialdehyde | Mols of Urea per mol of Dialdehyde | Silane (wt. %) | Dry Tensile Strength (N) | Hot Wet Tensile Strength (N) | Tensile Strength Retention (%) | Wt. % Add On |
|---|---|---|---|---|---|---|---|---|
| 25 | Resorcinol:CHDA | 1:1 | 0 | 1 | 58.579 | 47.979 | 81.90 | 53.46 |
| 26 | Resorcinol:CHDA | 1:1 | 4 | 1 | 30.030 | 5.360 | 17.85 | 14.90 |
| 27 | Resorcinol:CHDA | 1:1 | 8 | 1 | 23.100 | 5.098 | 22.07 | 9.22 |
| 28* | Resorcinol:CHDA | 1:1 | 12 | 1 | 20.907 | 2.931 | 14.02 | 8.05 |
| 29 | Resorcinol:Glut | 1:1 | 0 | 1 | 66.692 | 65.340 | 97.97 | ?55.35?? |
| 30 | Resorcinol:Glut | 1:1 | 4 | 1 | 47.738 | 44.069 | 92.31 | 16.99 |
| 31 | Resorcinol:Glut | 1:1 | 8 | 1 | 38.161 | 30.617 | 80.23 | 10.29 |
| 32 | Resorcinol:Glut | 1:1 | 12 | 1 | 30.461 | 20.048 | 65.81 | 7.72 |
| 33* | Resorcinol:Phthal | 1:1 | 0 | 1 | 12.820 | 0.000 | 0.00 | 10.17 |
| 34* | Resorcinol:Phthal | 1:1 | 4 | 1 | 7.896 | 0.000 | 0.00 | 3.44 |
| 35* | Resorcinol:Phthal | 1:1 | 8 | 1 | 9.346 | 0.000 | 0.00 | 2.98 |
| 36* | Resorcinol:Phthal | 1:1 | 12 | 1 | 7.953 | 0.000 | 0.00 | 2.59 |

*denotes Comparative Example

As shown in Tables 2, 3 and 4, above, the inventive substantially formaldehyde free binder compositions all retain at least 10 wt. % of their dry tensile strength when wet or provide acceptable hot wet strength, unless the amount of urea exceeds the inventive limits and/or there is insufficient silane to counter the adverse impact of the urea. The Example 17 resorcinol dialdehyde resin with 4 moles urea per mole of dialdehyde demonstrates a performance just below the lower limits of the performance of the inventive compositions.

In all the binder compositions in Examples 1-36, the amount of catalyst, based on the amount of resorcinol, was maintained at about 5 wt. % of NaOH (or equivalent ratio io of hydroxy groups in the base catalyst to the hydroxy groups 0.069:1, like in Example 3). The 'gelation time' is defined as the time taken after adding all the ingredients before forming a hard gel at room temperature. An acceptable gelation time is 30 minutes or more for binder compositions that are used directly after they are made, and is 2 weeks or more for binder compositions that are to be shipped. Table 5, below, shows the relationship between amount of base and gelation time. Adding organic solvents can increase the gelation time.

TABLE 5

Cure Speed As Function Of Amount Of NaOH

| Example | Composition | Equivalent ratio of OH groups in the base catalyst to OH groups in the binder | Gelation time |
|---|---|---|---|
| 37 | Resorcinol:CHDA | 0:1 | |
| 38 | Resorcinol:CHDA | 0.014:1 | 2 weeks |
| 39 | Resorcinol:CHDA | 0.028:1 | 1-2 week |
| 40 | Resorcinol:CHDA | 0.034:1 | 5-6 days |
| 3 | Resorcinol:CHDA | 0.069:1 | 3 days |
| 41 | Resorcinol:CHDA | 0.138:1 | 60 min |
| *42 | Resorcinol:CHDA | 0.275:1 | <30 min |

*denotes Comparative Example

As shown in Table 5, above, less than 20 wt. % of base (or equivalent ratio of hydroxy groups in the base catalyst to the hydroxy groups 0.275:1) based on the total solids weight of resorcinol is desirable, and less than 10 wt. % (or equivalent ratio of hydroxy groups in the base catalyst to the hydroxy groups 0.138:1) is preferred.

We claim:

1. A substantially formaldehyde free thermosetting binder composition that is free from added formaldehyde and phenol formaldehyde resins and which does not liberate substantial formaldehyde as a result of drying and/or curing, the composition comprising resorcinol dialdehyde resin from (i) resorcinol and (ii) one or more dialdehyde selected from the group consisting of cyclohexane dicarboxaldehyde, glutaraldehyde, and their mixtures and, further comprising an epoxy functional hydrolysable silane in the amount of from 0.3 to 1.5 wt.%, based on total resin composition solids, the compositions comprising aqueous or non-aqueous systems, wherein in the compositions, the ratio of the number of hydroxyl equivalent groups of the resorcinol to the number of aldehyde equivalent groups of the one or more dialdehyde ranges from 1:1 to 4:1, and, further,
   wherein when the (ii) one or more dialdehyde is glutaraldehyde the composition further comprises (iii) urea in the amount of from 0 to 10 moles urea per mole of glutaraldehyde.

2. The composition as claimed in claim 1, wherein the dialdehyde is a cyclohexane dialdehyde selected from the group consisting of cis-1,3cyclohexane dicarboxaldehyde, a trans-1,3 cyclohexane dicarboxaldehyde, a cis-1,4cyclohexane dicarboxaldehyde, a trans-1,4 cyclohexane dicarboxaldehyde, and mixtures of any two or more thereof and dissolved in water in presence of resorcinol.

3. The composition as claimed in claim 1, further comprising a base catalyst, the equivalent ratio of hydroxy groups in the base catalyst to the hydroxy groups which are present in the aqueous mixture of resorcinol and dialdehyde ranges from 0:1 to 0.28:1.

4. The composition as claimed in claim 1, comprising resorcinol dialdehyde resin from the (i) resorcinol, the (ii) one or more dialdehyde (iii) urea and (iv) base.

5. The composition as claimed in claim 1, wherein the number of hydroxyl equivalent groups of the resorcinol to the number of aldehyde equivalent groups of the one or more dialdehydes ranges from 1:1 to 3:1.

6. The composition as claimed in claim 1, wherein the epoxy functional hydrolysable silane is 3-glycidoxypropyl trimethoxy silane.

7. The composition as claimed in claim 1, wherein the binder composition is an aqueous binder composition or a binder composition powder.

8. A method of making a substantially formaldehyde free thermosetting binder composition that is free from added formaldehyde, are free from added phenol formaldehyde and which do not liberate substantial formaldehyde as a result of drying and/or curing, the method comprising reacting an aqueous mixture of (i) resorcinol and (ii) one or more dialdehyde selected from the group consisting of cyclohexane dicarboxaldehyde, glutaraldehyde, and their mixtures in the presence of a hard base catalyst to form a resorcinol dialdehyde resin, wherein the ratio of the number of hydroxyl equivalent groups of the resorcinol to the number of aldehyde equivalent groups of the one or more dialdehyde ranges from 1:1 to 4:1, and,
   further comprising including in the composition an epoxy functional hydrolysable silane in the amount of from 0.3 to 1.5 wt.%, based on total resin composition solids.

9. The method as claimed in claim 8, wherein the aqueous mixture further comprises (iii) urea.

* * * * *